United States Patent
Ly et al.

(10) Patent No.: US 11,664,961 B2
(45) Date of Patent: May 30, 2023

(54) HALF-DUPLEX USER EQUIPMENT OPERATION IN NEW RADIO FREQUENCY DIVISION DUPLEXED BANDS

(71) Applicant: QUALCOMM Incorporated, San Diego, CA (US)

(72) Inventors: Hung Dinh Ly, San Diego, CA (US); Peter Pui Lok Ang, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 16/949,305

(22) Filed: Oct. 23, 2020

(65) Prior Publication Data

US 2021/0135832 A1    May 6, 2021

Related U.S. Application Data

(60) Provisional application No. 62/928,916, filed on Oct. 31, 2019.

(51) Int. Cl.
| | |
|---|---|
| *H04L 5/14* | (2006.01) |
| *H04L 7/033* | (2006.01) |
| *H04W 72/0453* | (2023.01) |
| *H04W 74/08* | (2009.01) |
| *H04L 27/26* | (2006.01) |

(Continued)

(52) U.S. Cl.
CPC .............. *H04L 5/14* (2013.01); *H04L 5/0048* (2013.01); *H04L 7/0331* (2013.01); *H04L 27/2605* (2013.01); *H04W 24/08* (2013.01); *H04W 72/0453* (2013.01); *H04W 74/0825* (2013.01); *H04W 74/0833* (2013.01)

(58) Field of Classification Search
None
See application file for complete search history.

(56) References Cited

U.S. PATENT DOCUMENTS

| | | | | |
|---|---|---|---|---|
| 2010/0085901 A1* | 4/2010 | Womack | .............. | H04B 7/2656 370/278 |
| 2015/0327196 A1* | 11/2015 | Blankenship | ..... | H04W 56/0045 370/281 |

(Continued)

OTHER PUBLICATIONS

R4-1804119 "On NR N ta-offset" 3GPP WG4 #86bis Melbourne Apr. 16-20, 2018 (Year: 2018).*

(Continued)

*Primary Examiner* — Basil Ma
(74) *Attorney, Agent, or Firm* — Harrity & Harrity, LLP

(57) ABSTRACT

Various aspects of the present disclosure generally relate to wireless communication. In some aspects, a user equipment (UE) may determine a guard period associated with switching from a first communication mode to a second communication mode. The UE may be operating in a half-duplex frequency division duplexing mode of operation. The guard period may be determined based at least in part on at least one of: a number of phased locked loops to be used for the first communication mode and the second communication mode, and a particular subcarrier spacing associated with the UE. The UE may switch from the first communication mode to the second communication mode based at least in part on the guard period. Numerous other aspects are provided.

34 Claims, 11 Drawing Sheets

800 ⟶

810 — Determine a guard period associated with switching from a first communication mode to a second communication mode, wherein the UE is operating in a half-duplex FDD mode of operation, and wherein the guard period is determined based at least in part on at least one of: a number of PLLs to be used for the first communication mode and the second communication mode, or a particular subcarrier spacing associated with the UE 820 — Switch from the first communication mode to the second communication mode based at least in part on the guard period

(51) Int. Cl.
*H04W 24/08* (2009.01)
*H04L 5/00* (2006.01)

(56) References Cited

U.S. PATENT DOCUMENTS

2016/0219583 A1* 7/2016 Blankenship ......... H04W 74/04
2022/0377532 A1* 11/2022 He ......................... H04W 8/24

OTHER PUBLICATIONS

Interdigital: "LC-MTC HD-FDD Switching Time Calculation Analysis", 3GPH Draft, R4-140433, 3GPP TSG-RAN WG4 Meeting #70, LC-MTC HD-FDD Switching Time Calculation Analysis, 3rd Generation Partnership Project (3GPP), Mobile Competence Centre, 650, Route Des Lucioles, F-06921 Sophia-Antipolis Cedex, vol. RAN WG4, No. Prague, Czech Republic, Feb. 10, 2014-Feb. 14, 2014, Feb. 9, 2014 (Feb. 9, 2014), XP050740179, 4 Pages, Retrieved from the Internet, URL: http://www.3gpp.org/ftp/Meetings_3GPP_SYNC/RAN/RAN4/Docs/, [retrieved on Feb. 9, 2014].
Partial International Search Report—PCT/US2020/070696—ISA/EPO—Feb. 8, 2021.
Intel Corporation: "On NR NTA Offset", 3GPP Draft, R4-1804119, On NR NTA_Offset_Design_V1, 3GPP TSG-RAN WG4 Meeting #86bits, 3rd Generation Partnership Project (3GPP), Mobile Competence Centre, 650, Route Des Lucioles, F-06921 Sophia-Antipolis Cedex, France, vol. RAN WG4, No. Melbourne, Australia, Apr. 16, 2018-Apr. 20, 2018, Apr. 15, 2018 (Apr. 15, 2018), XP051431025, pp. 1-6, Retrieved from the Internet: URL: http://www.3gpp.org/ftp/Meetings%5F3GPP%5FSYNC/RAN4/Docs/, [retrieved on Apr. 15, 2018] Paragraph [0002].
Interdigital: "LC-Mtc HD-FDD Switching Time Calculation Analysis", 3GPP Draft, R4-140433, 3GPP TSG-RAN WG4 Meeting #70, LC-MTC-HD-FDD Switching Time Calculation Analysis, 3rd Generation Partnership Project (3GPP), Mobile Competence Centre, 650, Route Des Lucioles, F-06921 Sophia-Antipolis Cedex, vol. RAN WG4, No. Prague, Czech Republic, Feb. 10, 2014-Feb. 14, 2014, Feb. 9, 2014 (Feb. 9, 2014), XP050740179, 4 Pages, Retrieved from the Internet, URL: http://www.3gpp.org/ftp/Meetings_3GPP_SYNC/RAN/RAN4/Docs/, [retrieved on Feb. 9, 2014] Paragraphs [0002], [0003].
International Search Report and Written Opinion—PCT/US2020/070696—ISA/EPO—dated Apr. 8, 2021.
Partial International Search Report—PCT/US2020/070696—ISA/EPO—dated Feb. 9, 2021.
ZTE Corporation: "Open Areas on HD-FDD Operation for Low Cost MTC UEs", 3GPP Draft, R1-142218, 3GPP TSG RAN WG1 Meeting #77, 3rd Generation Partnership Project (3GPP), Mobile Competence Centre, 650, Route Des Lucioles, F-06921 Sophia-Antipolis Cedex, France, vol. RAN WG1, No. Seoul, Korea, May 19, 2014-May 23, 2014, May 18, 2014 (May 18, 2014), XP050789337, pp. 1-2, Retrieved from the Internet: URL: http://www.3gpp.org/ftp/Meetings_3GPP_SYNC/RAN1/RAN1/Docs/, [retrieved on May 18, 2014] Paragraph [0002].

* cited by examiner

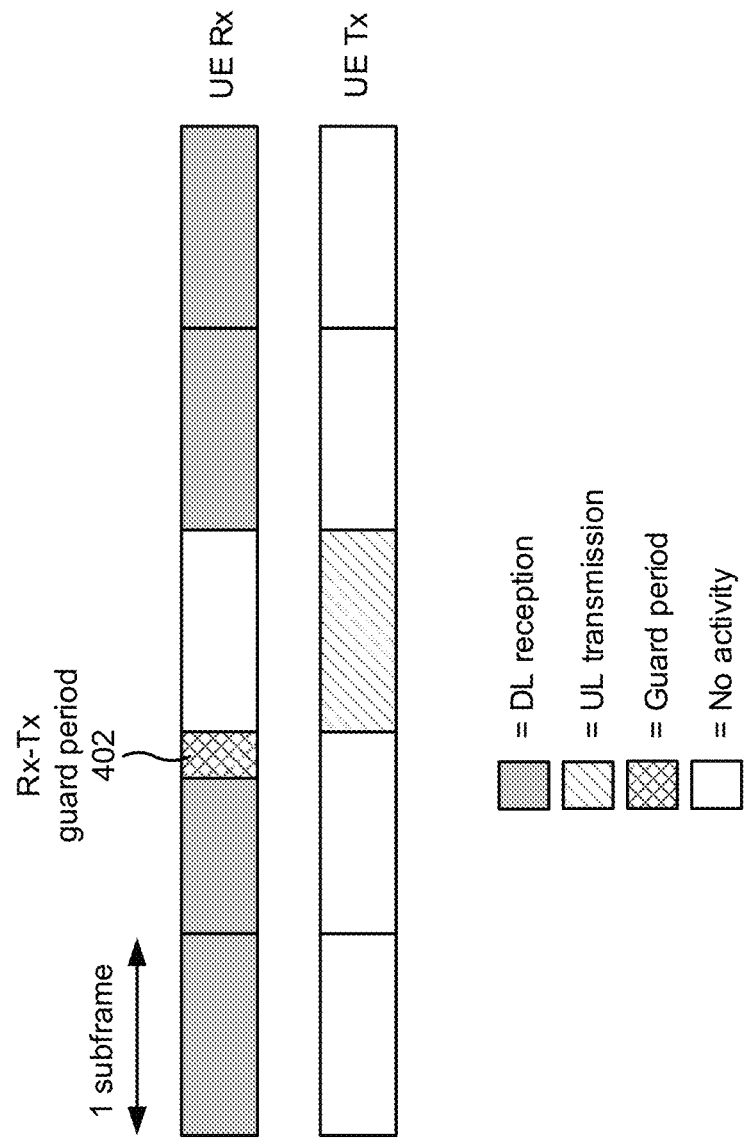

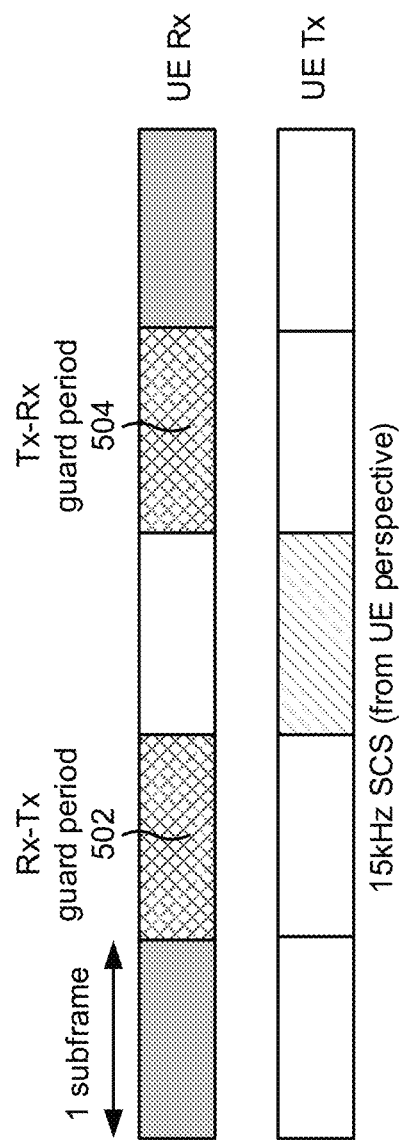
FIG. 5A
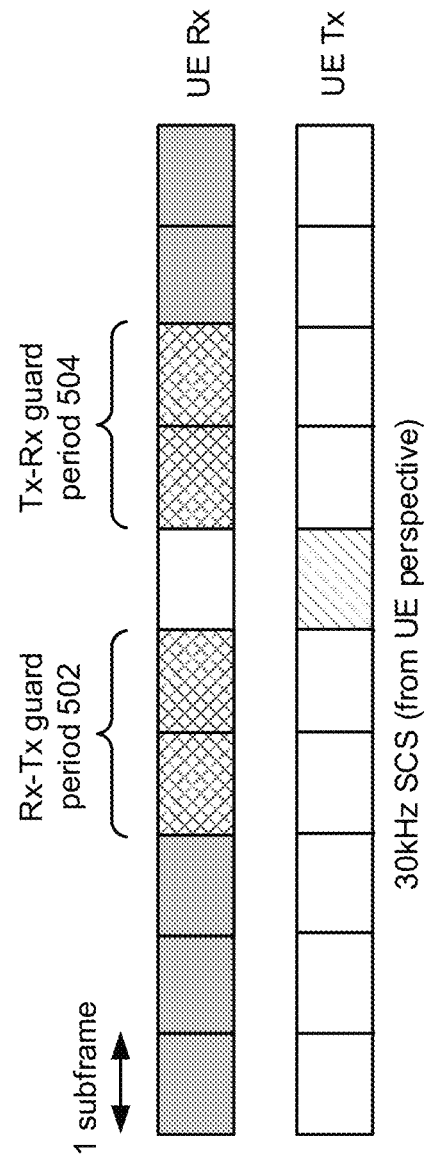
FIG. 5B
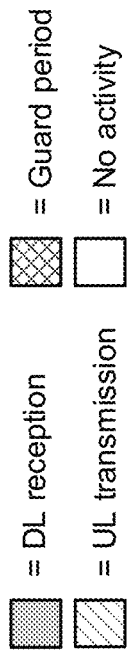

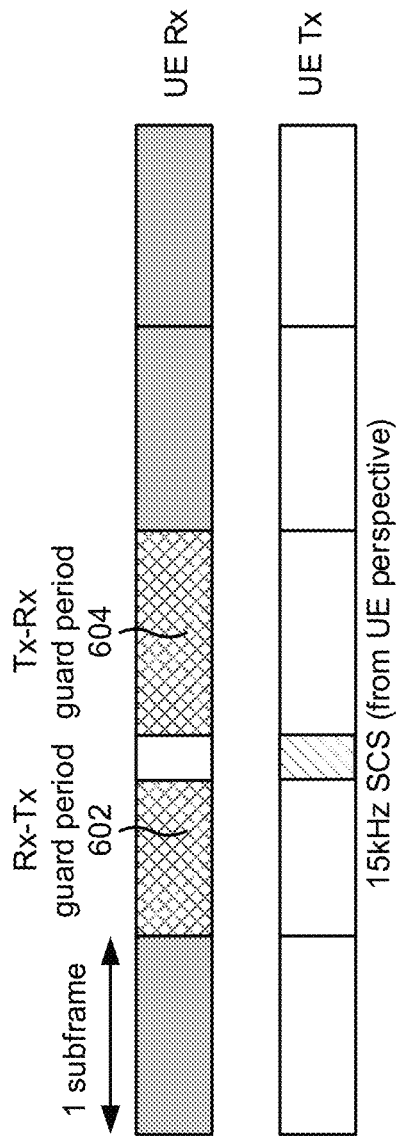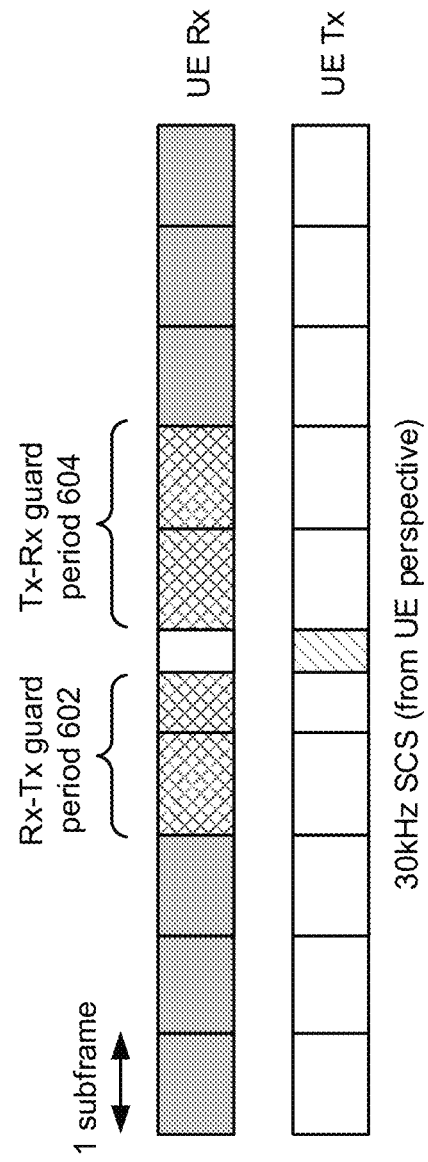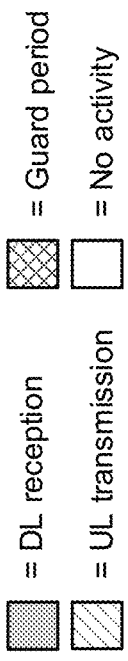
FIG. 6A
FIG. 6B

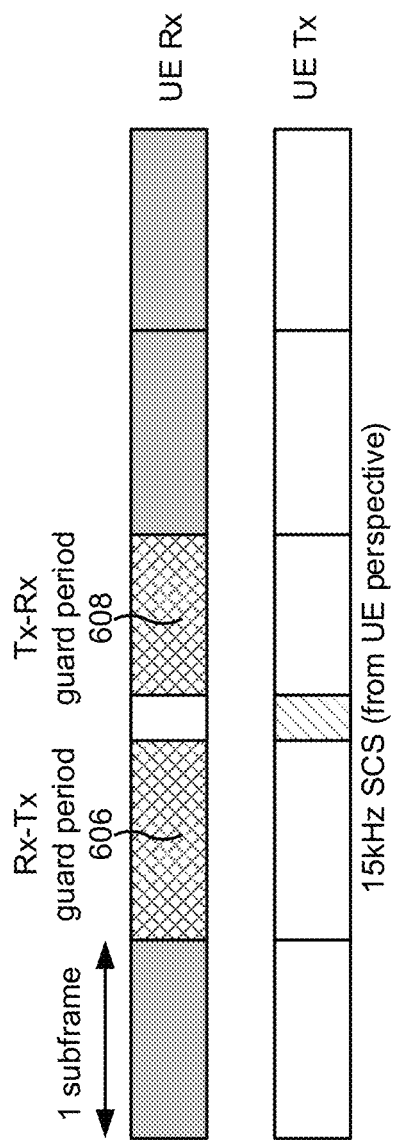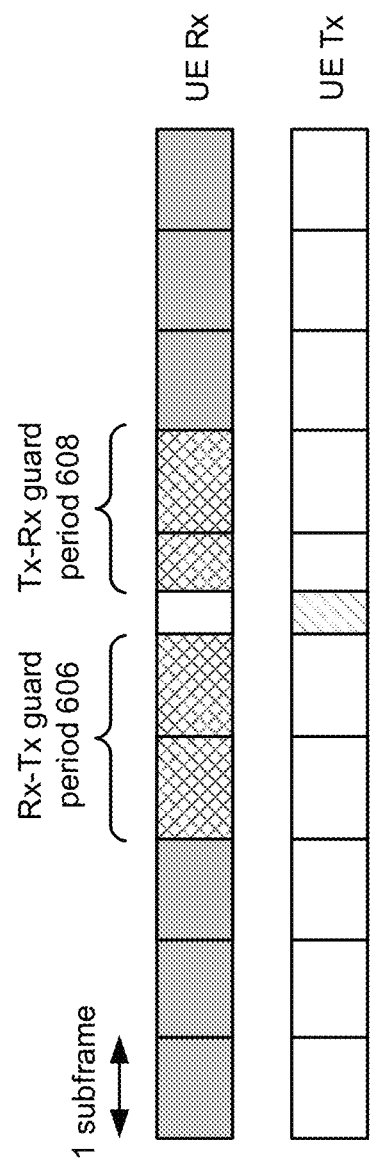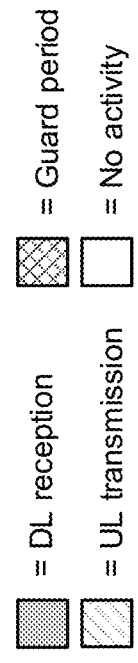

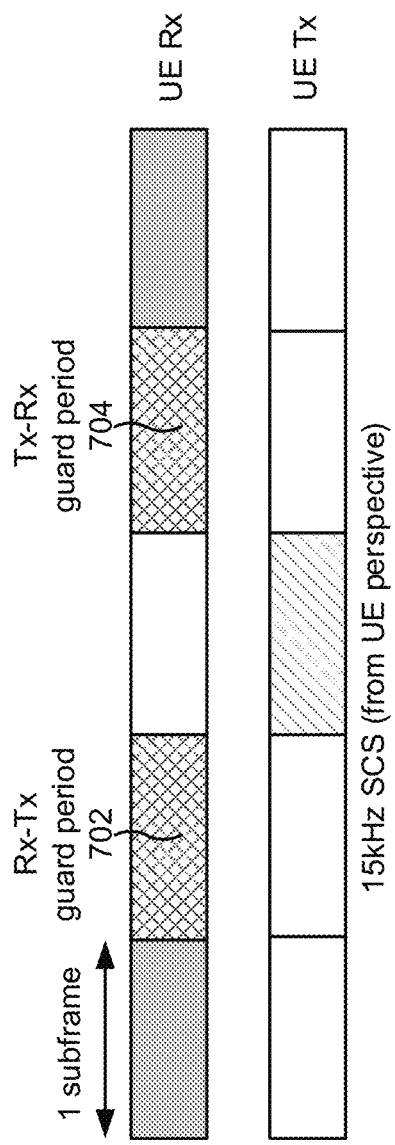
FIG. 7A
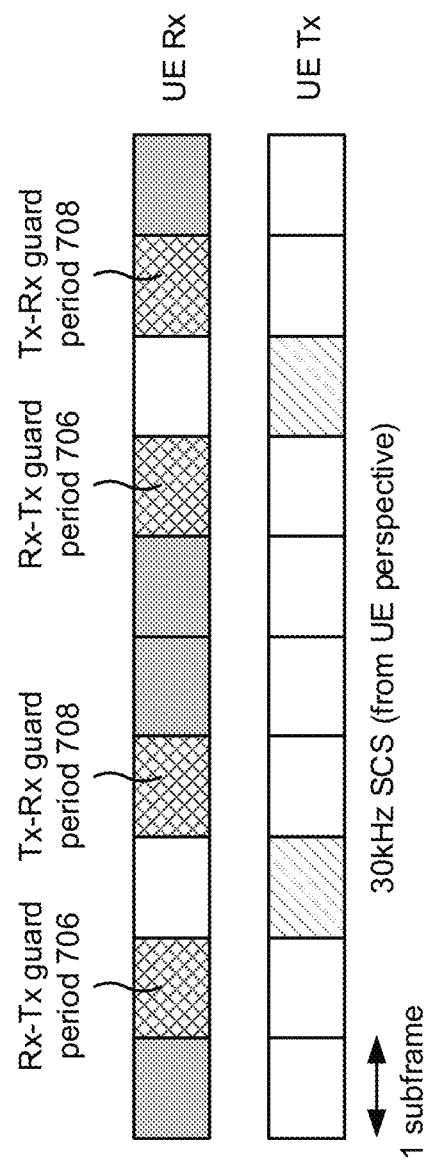
FIG. 7B
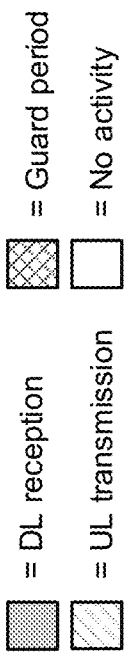

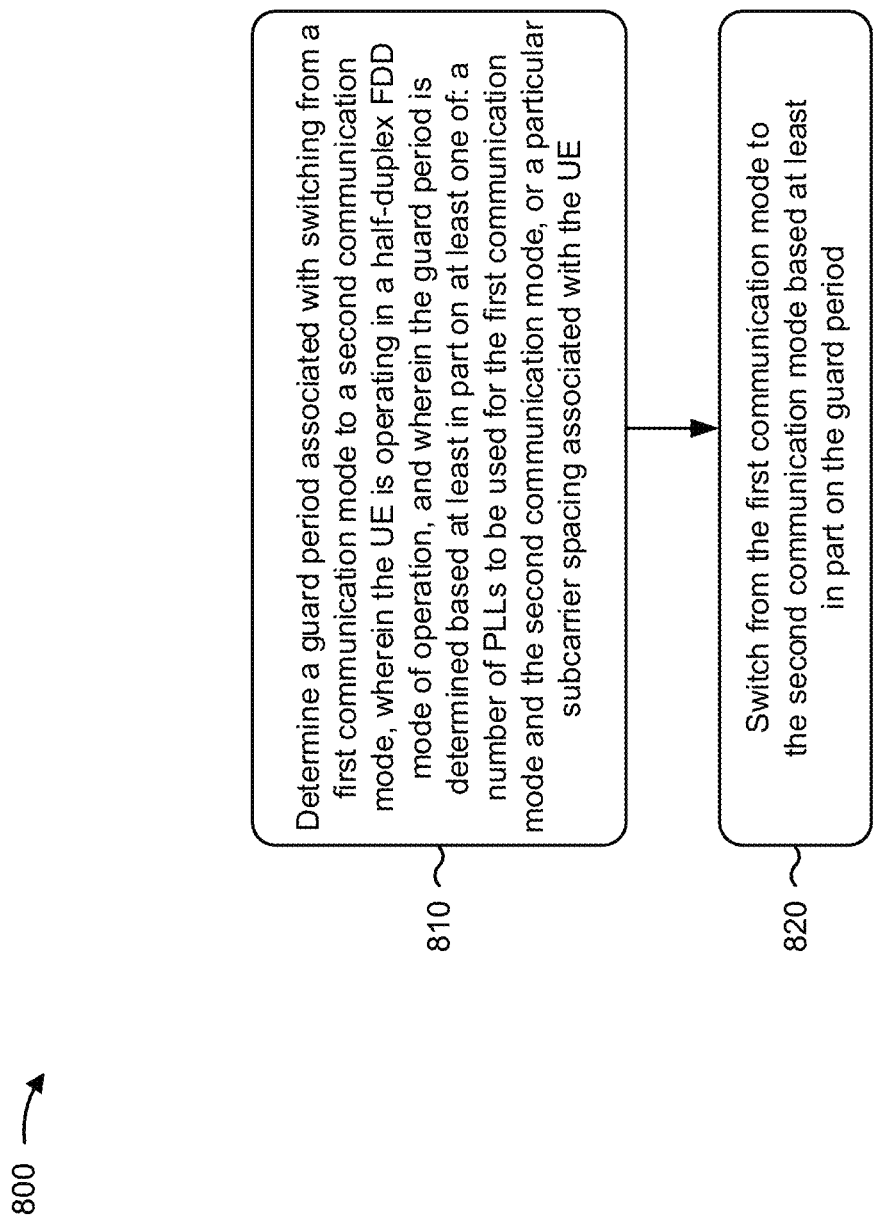

HALF-DUPLEX USER EQUIPMENT OPERATION IN NEW RADIO FREQUENCY DIVISION DUPLEXED BANDS

CROSS-REFERENCE TO RELATED APPLICATION

This Patent Application claims priority to U.S. Provisional Patent Application No. 62/928,916, filed on Oct. 31, 2019, entitled "HALF-DUPLEX USER EQUIPMENT OPERATION IN NEW RADIO FREQUENCY DIVISION DUPLEXED BANDS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for half-duplex user equipment (UE) operation in New Radio (NR) frequency division duplexed (FDD) bands.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a UE, may include determining a guard period associated with switching from a first communication mode to a second communication mode, wherein the UE is operating in a half-duplex FDD mode of operation, and wherein the guard period is determined based at least in part on at least one of: a number of phase locked loops (PLLs) to be used for the first communication mode and the second communication mode, and a particular subcarrier spacing associated with the UE; and switching from the first communication mode to the second communication mode based at least in part on the guard period.

In some aspects, a UE for wireless communication may include memory and one or more processors operatively coupled to the memory. The memory and the one or more processors may be configured to determine a guard period associated with switching from a first communication mode to a second communication mode, wherein the UE is operating in a half-duplex FDD mode of operation, and wherein the guard period is determined based at least in part on at least one of: a number of PLLs to be used for the first communication mode and the second communication mode, and a particular subcarrier spacing associated with the UE; and switch from the first communication mode to the second communication mode based at least in part on the guard period.

In some aspects, a non-transitory computer-readable medium may store one or more instructions for wireless communication. The one or more instructions, when executed by one or more processors of a UE, may cause the one or more processors to: determine a guard period associated with switching from a first communication mode to a second communication mode, wherein the UE is operating in a half-duplex FDD mode of operation, and wherein the guard period is determined based at least in part on at least one of: a number of PLLs to be used for the first communication mode and the second communication mode, and a particular subcarrier spacing associated with the UE; and switch from the first communication mode to the second communication mode based at least in part on the guard period.

In some aspects, an apparatus for wireless communication may include means for determining a guard period associated with switching from a first communication mode to a second communication mode, wherein the apparatus is operating in a half-duplex FDD mode of operation, and wherein the guard period is determined based at least in part on at least one of: a number of PLLs to be used for the first communication mode and the second communication mode, and a particular subcarrier spacing associated with apparatus; and means for switching from the first communication mode to the second communication mode based at least in part on the guard period.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A, 3B, 4A, 4B, 5A, 5B, 6A-6D, 7A, and 7B are diagrams illustrating examples associated with half-duplex user equipment (UE) operation in New Radio (NR) frequency division duplexed (FDD) bands, in accordance with various aspects of the present disclosure.

FIG. 8 is a diagram illustrating an example process performed, for example, by a user equipment, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure disclosed herein is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
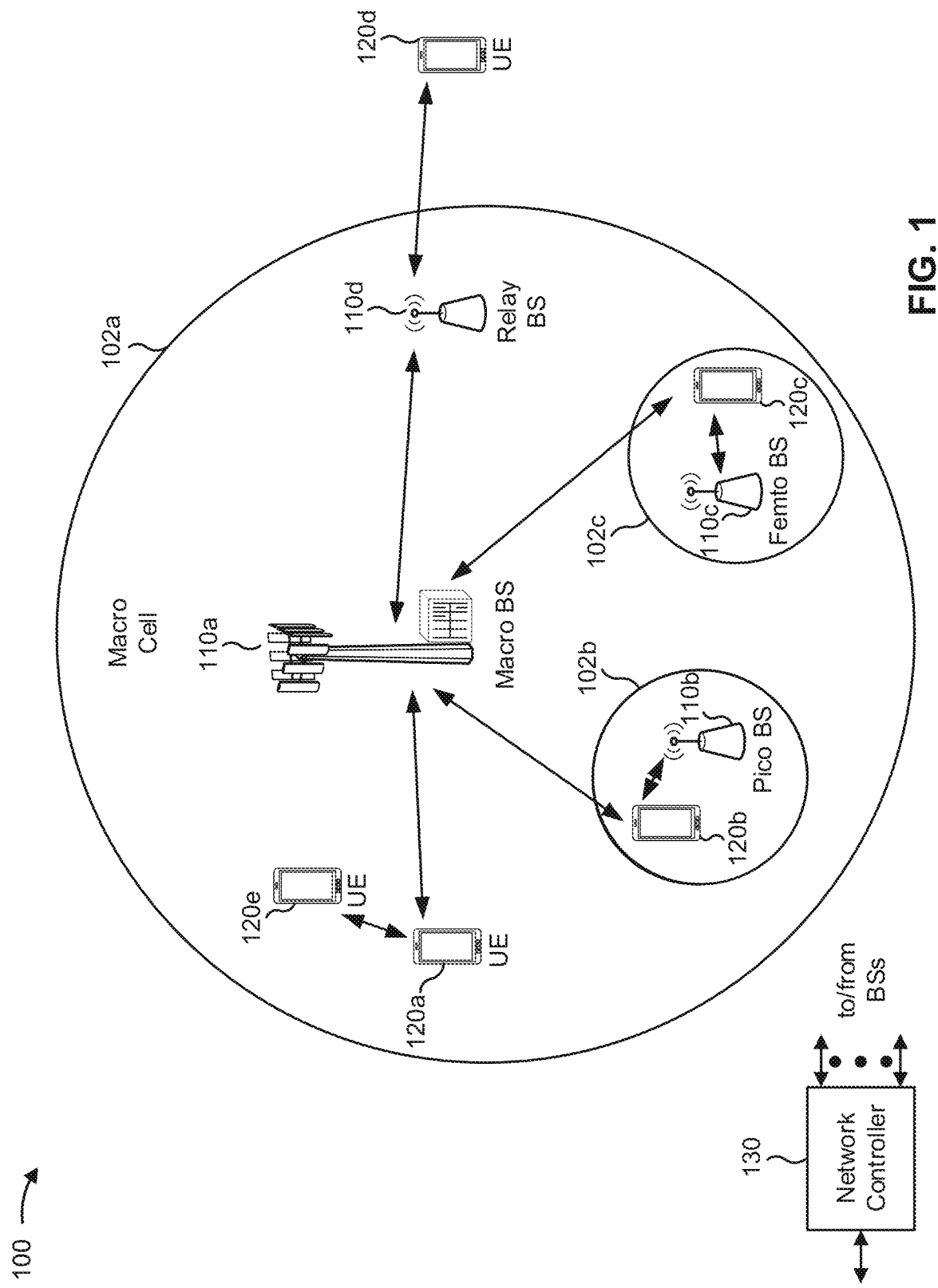
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
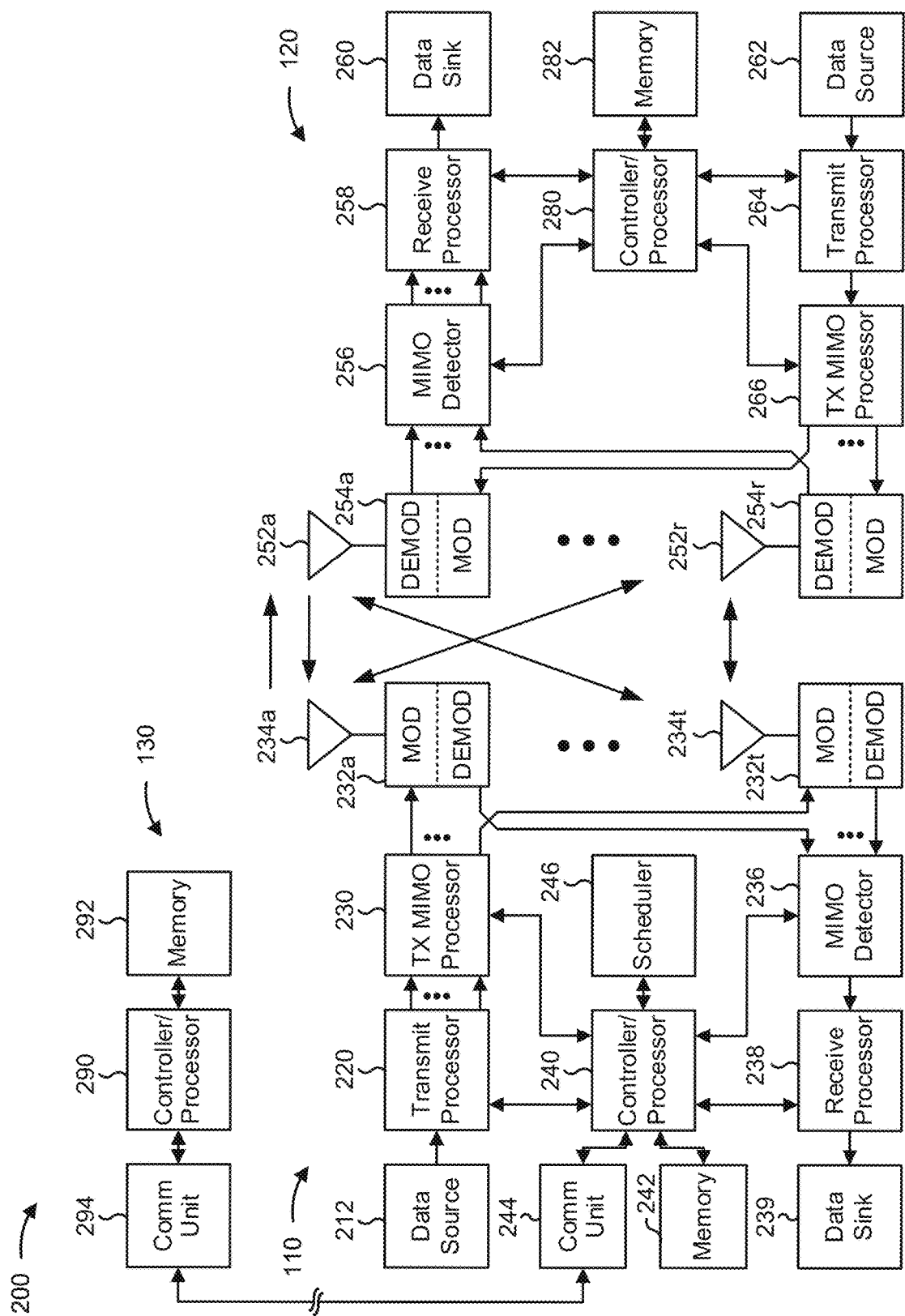
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with half-duplex UE operation in NR FDD bands, as described in more detail elsewhere herein. For example, controller/processor 240 of base station 110, controller/processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 800 of FIG. 8 and/or other processes as described herein. A scheduler 246 may schedule UEs for data transmission on the downlink and/or uplink.

In some aspects, UE 120 may include means for determining a guard period associated with switching from a first communication mode to a second communication mode, wherein the UE 120 is operating in a half-duplex FDD mode of operation, and wherein the guard period is determined based at least in part on at least one of: a number of PLLs to be used for the first communication mode and the second communication mode, and a particular subcarrier spacing associated with the UE 120; means for switching from the first communication mode to the second communication mode based at least in part on the guard period; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

In an NR network, it may be desirable to support so-called mid-tier NR functionality (referred to herein as NR-Light) that can be used, for example, to enable UEs of relatively low cost and/or low complexity to utilize the NR network. Such relatively low cost and/or low complexity devices may include, for example, a high-end MTC device (e.g., a security camera, a wearable device, and/or the like), a high-end IoT device, or a relatively low cost 5G device (e.g., low cost as compared to a cost of a UE that includes a Category 1, 20 megahertz (MHz) bandwidth, single band, full-duplex frequency division duplexing (FDD) modem).

One technique for reducing a cost and/or complexity of a UE is to design the UE to support half-duplex FDD operation (rather than full-duplex FDD). In such a case, UE cost and complexity are reduced by replacing a duplexer with a switch. This can reduce the cost of a UE modem by, for example, approximately 7-10%. Here, as a result of replacing the duplexer with a switch, the UE does not support full-duplex FDD (e.g., since the purpose of the duplexer is to multiplex uplink transmission and downlink reception at the same time), but can support half-duplex FDD.

Another way to reduce UE cost and complexity is for the UE to have a single PLL (rather than having dual PLLs). The cost of a UE modem with a single PLL may be approximately 2-4% less than that of a UE modem with dual PLLs. Notably, having a single PLL (rather than dual PLLs) may result in a comparatively larger switching gap for switching from uplink transmission to downlink reception (herein referred to as a Tx-Rx switch) and for switching from downlink reception to uplink transmission (herein referred to as an Rx-Tx switch) during half-duplex FDD operation. Therefore, a UE with a single PLL may achieve lower throughput than a UE with dual PLLs.

Whether an NR-Light UE has a single PLL or dual PLL may depend on its capability and use case. In general, it is desirable for NR-Light to support diverse types of devices (e.g., UEs having a single PLL, UEs having dual PLLs, and/or the like). For example, support for diverse types of devices may be advantageous when it is desirable to leverage an existing enhanced mobile broadband (eMBB) UE implementation (e.g., having dual PLLs) for some type of NR-Light UE.

Given the above considerations for NR-Light and low cost/complexity UEs, half-duplex UE operation in NR FDD bands needs to be defined. For example, a guard period associated with a switch from a first communication mode (e.g., downlink reception or uplink transmission) to a second communication mode (e.g., uplink transmission or downlink reception) needs to be designed in order to enable half-duplex FDD operation by a UE.

Some aspects described herein provide techniques and apparatuses for half-duplex UE operation in NR FDD bands. In some aspects, a half-duplex FDD UE may determine a guard period associated with switching from a first communication mode to a second communication mode based at least in part on a number of PLLs to be used for the first communication mode and/or the second communication mode, or based at least in part on a particular subcarrier spacing associated with the UE. The UE may then switch from the first communication mode to the second communication mode based at least in part on the guard period. Additional details are provided below.

FIGS. 3A, 3B, 4A, 4B, 5A, 5B, 6A-6D, 7A, and 7B are diagrams illustrating examples associated with half-duplex UE operation in NR FDD bands, in accordance with various aspects of the present disclosure.

As described above, to support half-duplex FDD operation by a UE, NR-Light may require a guard period associated with a switch from a first communication mode to a second communication mode. The switch from the first communication mode to the second communication mode may be a switch from downlink reception to uplink transmission (herein referred to as an Rx-Tx switch) or from uplink transmission to downlink reception (herein referred to as a Tx-Rx switch). The UE will perform these types of switches at various times during operation in half-duplex FDD in order to selectively communicate on either the downlink or the uplink.

Figure 3A:
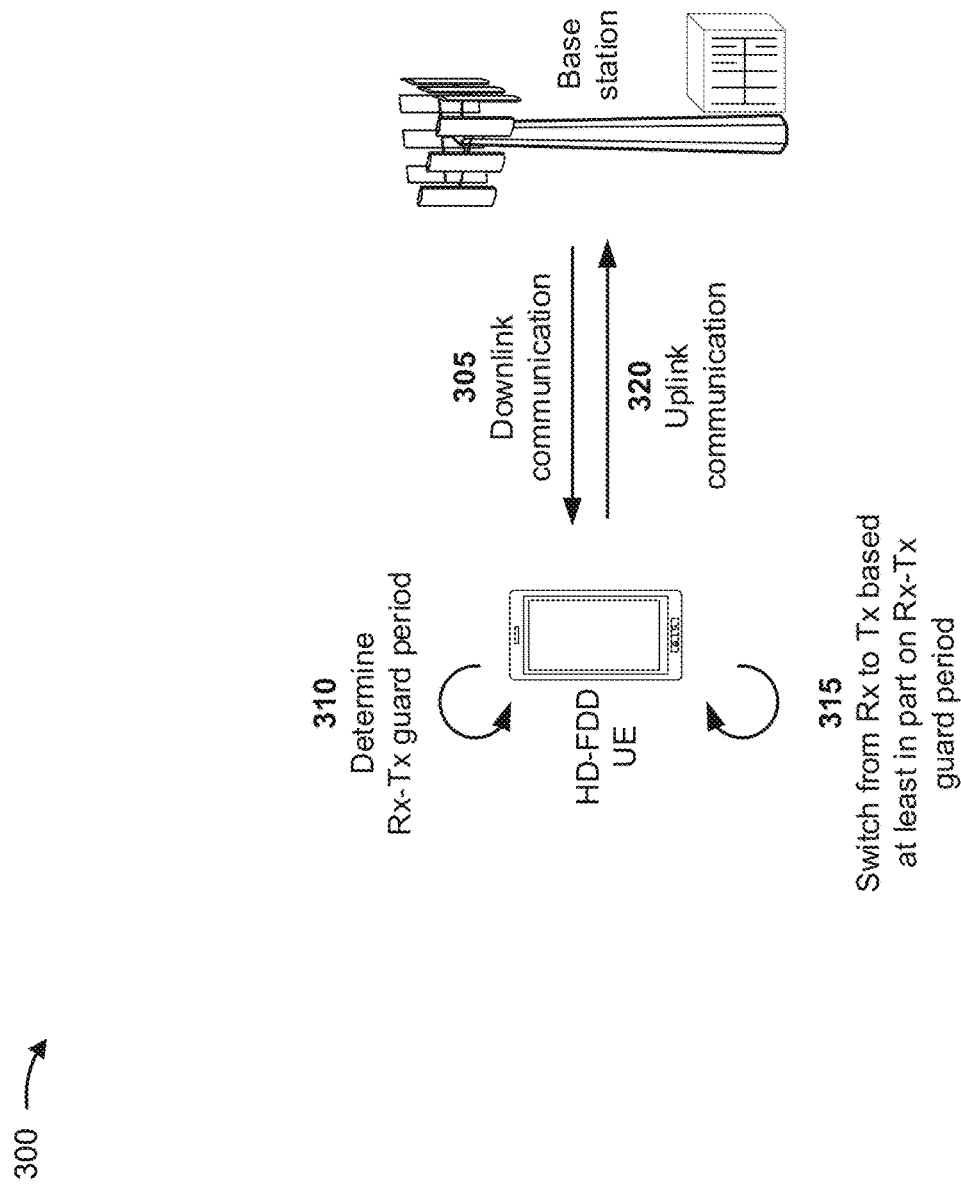

FIG. 3A is a diagram illustrating an example 300 associated with a UE switching from downlink reception to uplink transmission during half-duplex FDD operation. Example 300 starts with the UE in a first communication mode—downlink reception. As shown by reference 305, a base station (e.g., base station 110) may provide, and the UE may receive, a downlink communication during a period of time in which the UE is in the downlink reception communication mode. In this example, the UE needs to switch to a second communication mode—uplink transmission—after some period of time operating in the downlink reception communication mode.

As shown by reference 310, the UE may determine a guard period associated with a switch from downlink reception to uplink transmission. That is, the UE may determine an Rx-Tx guard period to be applied when the UE performs the Rx-Tx switch. Details regarding determination of such a guard period are provided below. As shown by reference 315, the UE may switch from downlink reception to uplink transmission based at least in part on the Rx-Tx guard period. That is, the UE may perform the Rx-Tx switch in accordance with the Rx-Tx guard period. As shown by reference 320, the UE, now operating in the uplink transmission communication mode, may transmit an uplink communication to the base station.

Figure 3B:
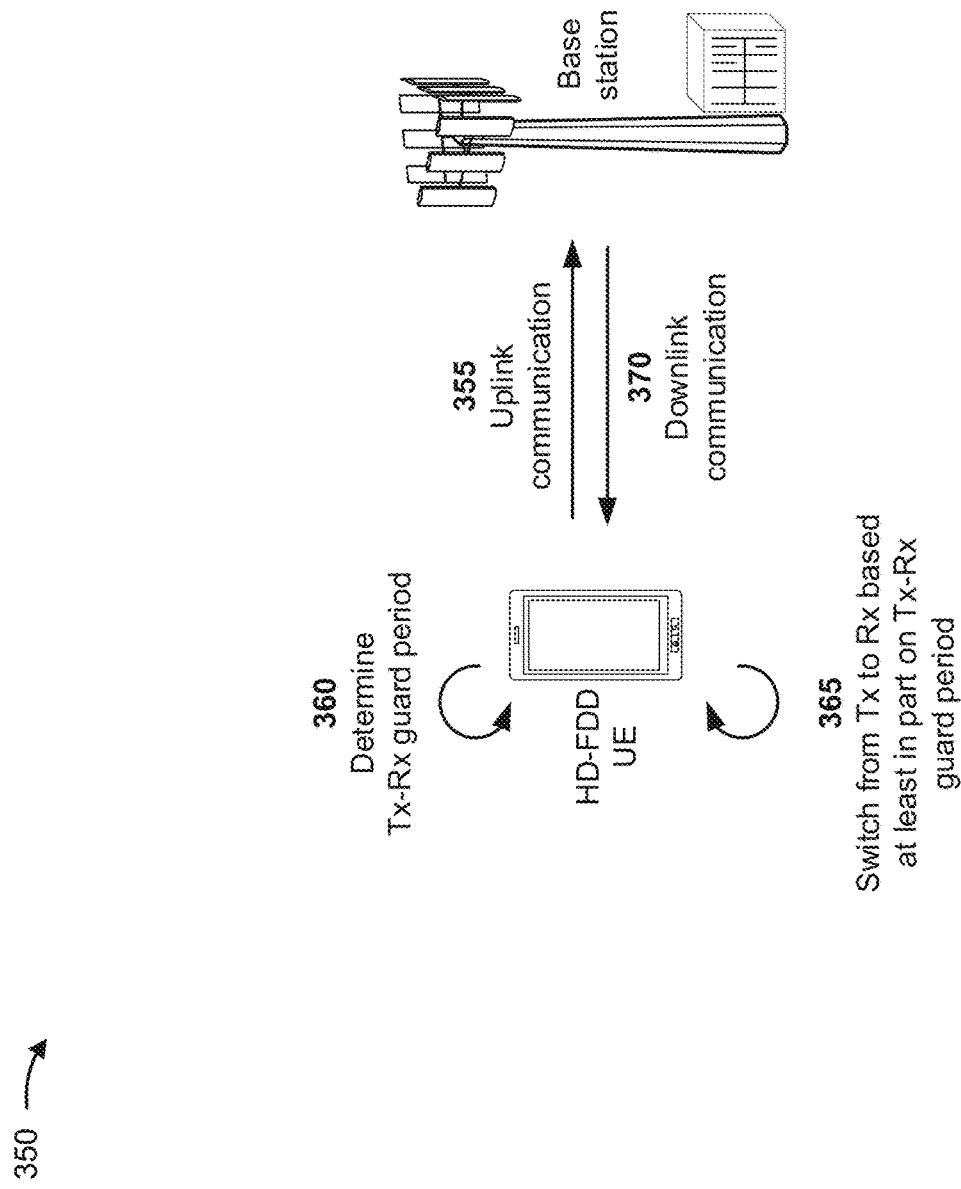

FIG. 3B is a diagram illustrating an example 350 associated with a UE switching from uplink transmission to downlink reception during half-duplex FDD operation. Example 350 starts with the UE in a first communication mode—uplink transmission. As shown by reference 355, the UE may transmit, and the base station may receive, an uplink communication during a period of time in which the UE is in the uplink transmission communication mode. In this example, the UE needs to switch to a second communication mode—downlink reception—after some period of time operating in the uplink transmission communication mode.

As shown by reference 360, the UE may determine a guard period associated with a switch from uplink transmission to downlink reception. That is, the UE may determine a Tx-Rx guard period to be applied when the UE performs the Tx-Rx switch. Details regarding determination of such a guard period are provided below. As shown by reference 365, the UE may switch from uplink transmission to downlink reception based at least in part on the Tx-Rx guard period. That is, the UE may perform the Tx-Rx switch in accordance with the Tx-Rx guard period. As shown by reference 370, the UE, now operating in the downlink reception communication mode, may receive a downlink communication from the base station.

Notably, the sequence of operations illustrated by example 300 may precede the sequence of operations illustrated by example 350, and vice versa. For example, the UE may perform a first Rx-Tx switch, followed by a first Tx-Rx switch, followed by a second Rx-Tx switch, followed by a second Tx-Rx switch, and so on. In this way, the UE may alternately switch between operation in the downlink reception communication mode and the uplink transmission communication mode during half-duplex FDD operation.

In some aspects, the UE may provide an indication that the UE supports operation in the half-duplex FDD mode of operation. In some considered FDD bands where NR-Light operates, full-duplex FDD UEs may already operate. Furthermore, since half-duplex FDD may have throughput impact, full-duplex FDD may be useful in some use cases requiring higher throughput. As a result, both full-duplex FDD UEs and half-duplex FDD UEs may need to coexist in NR-Light. Therefore, in order for NR-Light to support both full-duplex FDD operation and half-duplex FDD operation, the UE may be configured to provide an indication of whether the UE supports half-duplex FDD and/or full-duplex FDD. In some aspects, the indication may be provided in a UE capability report transmitted by the UE. Alternatively, it is possible that NR-Light may support only half-duplex FDD operation by UEs.

In some aspects, the UE may determine a guard period (e.g., the Rx-Tx guard period and/or the Tx-Rx guard period), associated with a switch during half-duplex FDD operation, based at least in part on a number of PLLs to be used for communication in the first and second communication modes. For example, NR-Light may support UEs with a single PLL and UEs with dual PLLs. Thus, in some aspects, the guard period may depend at least partially on whether the UE has a single PLL or dual PLLs.

For example, when the UE has dual PLLs, the UE may be configured to use a first PLL for the first communication mode and to use a second PLL for the second communication mode. In such a case, a duration of a given guard period may be determined based on the UE having dual PLLs. FIG. 4A is a diagram illustrating example guard periods when the UE has dual PLLs. As shown in FIG. 4A, when the UE has dual PLLs (e.g., one PLL for UE Tx and another for UE Rx), only an Rx-Tx guard period 402 may be needed, while a Tx-Rx guard period may be (implicitly) provided as part of a timing advance indicated by the base station. In such a case, the UE may determine a duration (e.g., a number of symbols, a number of slots, a number of subframes, and/or the like) of a given Rx-Tx guard period 402 based at least in part on the UE having dual PLLs. For example, the UE may be configured with information that identifies a duration of a Rx-Tx guard period 402 for half-duplex FDD UEs having dual PLLs, or a manner in which to determine the Rx-Tx guard period 402, and may determine the Rx-Tx guard period 402 accordingly. In some aspects, the Rx-Tx guard period 402 for the dual PLL UE may be comparatively shorter than the corresponding Rx-Tx guard period 402 for a single PLL UE (e.g., since the UE need not switch any PLL to another RF chain when the UE has dual PLLs).

Figure 4B:
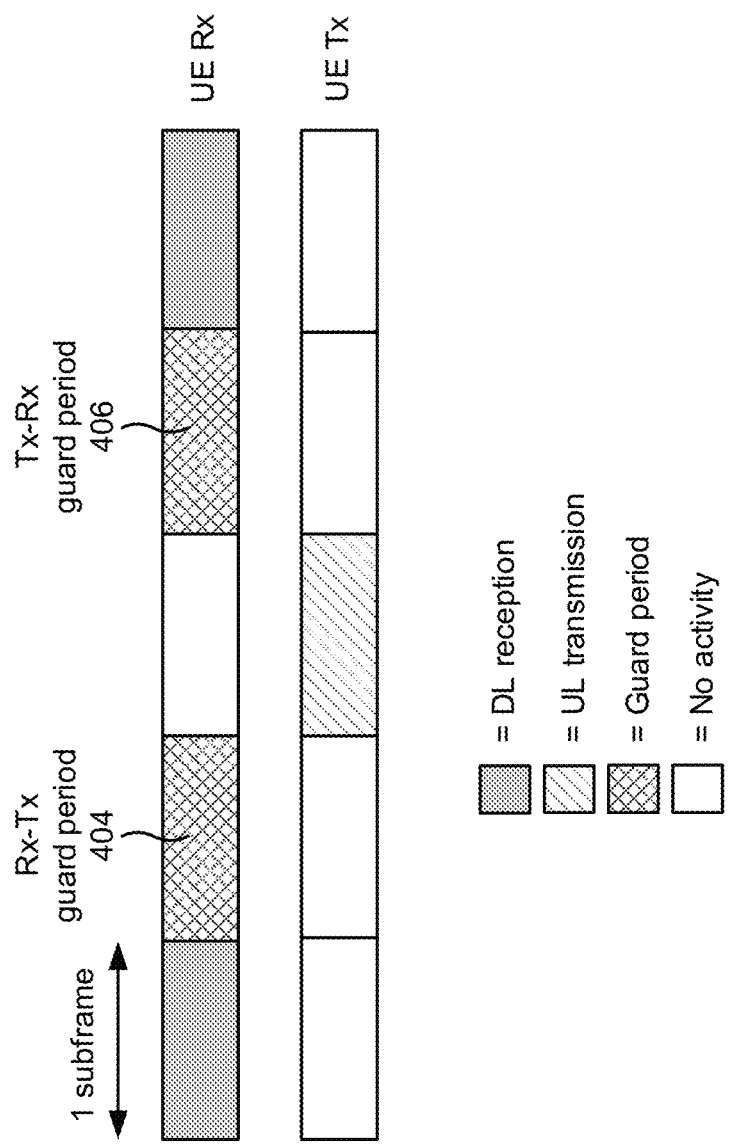

As another example, when the UE has a single PLL, the UE may be configured to use the single PLL for both the first communication mode and the second communication mode. In such a case, a duration of a given guard period may be determined based on the UE having a single PLL. FIG. 4B is a diagram illustrating example guard periods when the UE has a single PLL. As shown in FIG. 4B, when the UE has a single PLL, (e.g., one PLL to be used for both Tx and Rx) an Rx-Tx guard period 404 and a Tx-Rx guard period 406 may be needed. In such a case, the UE may determine a duration of the Rx-Tx guard period 404 and/or a duration of the Tx-Rx guard period 406 based at least in part on the UE having a single PLL. For example, the UE may be configured with information that identifies a duration of an Rx-Tx guard period 404 for half-duplex FDD UEs having a single PLL or a manner in which to determine the Rx-Tx guard period 404, and may determine the Rx-Tx guard period 404 accordingly. Similarly, the UE may be configured with information that identifies a duration of a Tx-Rx guard period 406 for half-duplex FDD UEs having a single PLL, or a manner in which to determine the Tx-Rx guard period 406, and may determine the Tx-Rx guard period 406 accordingly. In some aspects, a guard period (e.g., an Rx-Tx guard period 404 and/or a Tx-Rx guard period 406) for half-duplex FDD UEs having a single PLL may be, for example, 1 millisecond (ms).

In some aspects, the UE may provide, to the base station, an indication of whether the UE supports a first guard period type or supports a second guard period type. Here, the different guard period types may correspond to a number of PLLs. For example, the first guard period type may correspond to a single PLL and the second guard period type may correspond to dual PLLs. In this way, the UE can (implicitly) indicate whether the UE has a single PLL or has dual PLLs. In some aspects, the base station may transmit or receive communications based at least in part on the indicated guard period type (i.e., the base station may account for the indicated guard period type when communicating with the UE). In some aspects, the indication may be provided in a UE capability report transmitted by the UE.

In some aspects, the UE may determine the guard period (e.g., an Rx-Tx guard period or a Tx-Rx guard period) based at least in part on a particular subcarrier spacing (SCS) associated with the UE. For example, guard periods may be of a fixed time duration (e.g., 1 ms) regardless of numerology. Thus, in some aspects, the guard period may be a function of the particular subcarrier spacing over a fixed time duration. Here, the guard period can be represented in a number of slots (e.g., 10 slots for 15 kilohertz (kHz) SCS, or 20 slots for 30 kHz SCS, when using a 1 ms guard period). FIGS. 5A and 5B show examples of guard periods (e.g., a Rx-Tx guard period 502 and a Tx-Rx guard period 504) that have a fixed time duration regardless of numerology. A 15 kHz SCS is used in FIG. 5A, and a 30 kHz SCS is used in FIG. 5B. As shown, the Rx-Tx guard period 502 and the Tx-Rx guard period 504 for these SCSs have the same duration (e.g., 1 ms), regardless of the numerology used.

In some aspects, the particular SCS based at least in part on which the guard period is determined may be identified by the UE. Such identification may be needed when, for example, an SCS for a first communication mode is different from an SCS associated with a second communication mode. In some aspects, the UE may be configured to identify the particular SCS as an SCS associated with receiving a downlink communication. In some aspects, the UE may be configured to identify the particular SCS as an SCS associated with transmitting an uplink communication.

In some aspects, the UE may be configured to identify the particular SCS as a function of a first SCS (e.g., the SCS associated with receiving a downlink communication) and a second SCS (e.g., the SCS associated with transmitting an uplink communication). For example, the function may indicate that the particular SCS is a smaller SCS of the first SCS and the second SCS. As another example, the function may indicate that the particular SCS is a larger SCS of the first SCS and the second SCS. In some aspects, the UE may be configured to identify the particular SCS based at least in part on a fixed reference SCS (e.g., a reference SCS identified in a relevant 3GPP specification), rather than based on an SCS associated with the first communication mode or an SCS associated with the second communication mode.

In some aspects, the UE may identify the particular SCS based at least in part on a direction of a given switch. For example, the UE may be configured to identify the particular SCS as the SCS associated with a first communication mode (e.g., downlink reception) when the guard period is for a switch from the first communication mode to a second communication mode (e.g., a Rx-Tx switch), and may be configured to identify the particular SCS as the SCS associated with the second communication mode (e.g., uplink transmission) when the guard period is for a switch from the second communication mode to the first communication mode (e.g., a Tx-Rx switch). As another example, the UE may be configured to identify the particular SCS as the SCS associated with the second communication mode when the guard period is for a switch from the first communication mode to the second communication mode, and may be configured to identify the particular SCS as the SCS associated with the first communication mode when the guard period is for a switch from the second communication mode to the first communication mode.

In some aspects, a guard period associated with a switch from a first communication mode to a second communication mode may match a guard period associated with a switch from the second communication mode to the first communication mode. For example, as illustrated in FIGS. 5A and 5B, the Rx-Tx guard period 502 may match the Tx-Rx guard period 504.

In some aspects, the guard period associated with the switch from the first communication mode to the second communication mode may be different from a guard period associated with a switch from the second communication mode to the first communication mode. FIGS. 6A-6D illustrate examples of guard periods differing among different types of switches. In FIGS. 6A and 6B, Rx-Tx guard periods 602 are shorter than Tx-Rx guard periods 604 for both a 15 kHz SCS and a 30 kHz SCS. Conversely, in FIGS. 6C and 6D, Rx-Tx guard periods 606 are longer than Tx-Rx guard periods 608 for both a 15 kHz SCS and a 30 kHz SCS. In some aspects, guard periods of different length may be used when, for example, an uplink communication to be transmitted by the UE is relatively short (e.g., an uplink transmission that uses physical uplink control channel (PUCCH) formats 0/2, an uplink transmission that requires only 1 or 2 symbols, and/or the like).

In some aspects, the UE may provide guard period support information associated with the UE. The guard period support information may include, for example, information that identifies a size of guard periods that is supported by the UE. In some aspects, a resolution of the guard period support information may be in terms of symbols, slots, subframes, and/or the like. In some aspects, the guard period support information may include information that identifies a reference SCS corresponding to the guard period support information (e.g., a reference SCS based at least in part on which the guard period support information was determined). In some aspects, the guard period support information may be used by the base station to update and/or modify a guard period used for communications between the UE and the base station.

In some aspects, the guard period may be a function of a numerology associated with the first communication mode or the second communication mode. That is, in some aspects, the guard period duration may be different for different SCSs. FIGS. 7A and 7B illustrate examples of guard periods differing among different SCSs. As can be seen from comparing guard periods shown in FIGS. 7A and 7B, a given guard period associated with a 15 kHz SCS (e.g., Rx-Tx guard period 702, Tx-Rx guard period 704) may be longer than a given guard period (e.g., Rx-Tx guard period 706, Tx-Rx guard period 708) associated with a 30 kHz SCS.

In some aspects, when operating in the half-duplex FDD mode of operation, the UE may identify a potential collision involving an uplink communication (e.g., to be transmitted by the UE) and/or a guard period associated with a switch from one communication mode to another. The UE may therefore need to be configured to manage such potential collisions during half-duplex FDD operation. In some aspects, the UE may be configured with a set of collision rules. Here, upon identifying a potential collision, the UE may determine a collision rule associated with managing the potential collision, and may manage the potential collision according to the collision rule.

For example, in some aspects, the potential collision may be between a synchronization signal block (SSB) or a channel state information reference signal (CSI-RS) and the uplink communication and/or the guard period (e.g., the guard period associated with the uplink communication). In such a case, the collision rule may indicate that the UE is to perform a radio resource management (RRM) measurement and drop the uplink communication, or may indicate that the UE is to skip the RRM measurement and transmit the uplink communication. Alternatively, the collision rule may indicate that the UE is not to expect a collision involving an SSB or CSI-RS for mobility. In some aspects, the collision rule for such a potential collision may indicate that the UE is to manage the potential collision based at least in part on a service type of the uplink communication (e.g., based at least in part on whether the uplink communication is an eMBB communication, in which case the UE may perform the RRM measurement and drop the uplink communication, or an ultra-reliable low-latency communication (URLLC), in which case the UE may transmit the uplink communication and skip the RRM measurement).

As another example, in some aspects, the potential collision may be between the guard period and a pre-scheduled or pre-configured resource associated with the uplink communication. In some aspects, the collision rule may indicate that the UE is to drop the uplink communication, or may indicate that the UE is to puncture a portion of the uplink communication that collides with the guard period. In some aspects, the pre-scheduled or pre-configure resource may be associated with, for example, a random access channel (RACH) occasion, a physical uplink shared channel (PUSCH) occasion associated with a RACH procedure, a grant-free uplink transmission, and/or the like.

As another example, in some aspects, the potential collision may be between a downlink communication and the uplink communication and/or the guard period (e.g., the guard period associated with the uplink communication). In some aspects, the collision rule may indicate that the UE is to drop the uplink communication and receive the downlink communication, or may indicate that the UE is to drop the downlink communication and transmit the uplink communication. Alternatively, the collision rule may indicate that the UE is not to expect collisions between downlink communications and uplink communications. In some aspects, the downlink communication may be, for example, a paging physical downlink control channel (PDCCH), a paging physical downlink shared channel (PDSCH), a system information PDCCH, a system information PDSCH, and/or the like.

In general, in some aspects, the collision rule may indicate that the UE is to manage the potential collision based at least in part on a configuration of the UE for a given type of collision (e.g., based on a UE implementation).

As indicated above, FIGS. 3A, 3B, 4A, 4B, 5A, 5B, 6A-6D, 7A, and 7B are provided as examples. Other examples may differ from what is described with respect to FIGS. 3A, 3B, 4A, 4B, 5A, 5B, 6A-6D, 7A, and 7B.

FIG. 8 is a diagram illustrating an example process 800 performed, for example, by a UE, in accordance with various aspects of the present disclosure. Example process 800 is an example where the UE (e.g., UE 120 and/or the like) performs operations associated with half-duplex UE operation in NR FDD bands, in accordance with various aspects of the present disclosure.

As shown in FIG. 8, in some aspects, process 800 may include determining a guard period associated with switching from a first communication mode to a second communication mode (block 810). For example, the UE (e.g., using receive processor 258, transmit processor 264, controller/processor 280, memory 282, and/or the like) may determine a guard period associated with switching from a first communication mode to a second communication mode, as described above. In some aspects, the UE is operating in a half-duplex FDD mode of operation. In some aspects, the guard period is determined based at least in part on at least one of a number of PLLs to be used for the first communication mode and the second communication mode, and a particular subcarrier spacing associated with UE.

As further shown in FIG. 8, in some aspects, process 800 may include switching from the first communication mode to the second communication mode based at least in part on the guard period (block 820). For example, the UE (e.g., using receive processor 258, transmit processor 264, controller/processor 280, memory 282, and/or the like) may switch from the first communication mode to the second communication mode based at least in part on the guard period, as described above.

Process 800 may include additional aspects, such as any single aspect or any combination of aspects described below and/or in connection with one or more other processes described elsewhere herein.

In a first aspect, the UE is to use a single PLL for both the first communication mode and the second communication mode.

In a second aspect, alone or in combination with the first aspect, the UE is to use a first PLL for the first communication mode and a second PLL for the second communication mode.

In a third aspect, alone or in combination with one or more of the first and second aspects, process 800 includes providing an indication of whether the UE supports a first guard period type or supports a second guard period type.

In a fourth aspect, alone or in combination with one or more of the first through third aspects, process 800 includes providing an indication that the UE supports operation in the half-duplex FDD mode of operation.

In a fifth aspect, alone or in combination with one or more of the first through fourth aspects, the guard period is a function of the particular subcarrier spacing over a fixed time duration.

In a sixth aspect, alone or in combination with one or more of the first through fifth aspects, the particular subcarrier spacing is a subcarrier spacing associated with receiving a downlink communication.

In a seventh aspect, alone or in combination with one or more of the first through sixth aspects, the particular subcarrier spacing is a subcarrier spacing associated with transmitting an uplink communication.

In an eighth aspect, alone or in combination with one or more of the first through seventh aspects, the UE is to use a first subcarrier spacing for the first communication mode and is to use a second subcarrier spacing for the second communication mode. Here, the particular subcarrier spacing is a function of the first subcarrier spacing and the second subcarrier spacing.

In a ninth aspect, alone or in combination with one or more of the first through eighth aspects, the particular subcarrier spacing is a smaller subcarrier spacing of the first subcarrier spacing and the second subcarrier spacing.

In a tenth aspect, alone or in combination with one or more of the first through ninth aspects, the particular subcarrier spacing is a larger subcarrier spacing of the first subcarrier spacing and the second subcarrier spacing.

In an eleventh aspect, alone or in combination with one or more of the first through tenth aspects, the particular subcarrier spacing is a fixed reference subcarrier spacing.

In a twelfth aspect, alone or in combination with one or more of the first through eleventh aspects, the particular subcarrier spacing is based at least in part on the first communication mode being downlink reception and the second communication mode being uplink transmission.

In a thirteenth aspect, alone or in combination with one or more of the first through twelfth aspects, the particular subcarrier spacing is based at least in part on the first communication mode being uplink transmission and the second communication mode being downlink reception.

In a fourteenth aspect, alone or in combination with one or more of the first through thirteenth aspects, the guard period associated with the switch from the first communication mode to the second communication mode matches a guard period associated with a switch from the second communication mode to the first communication mode.

In a fifteenth aspect, alone or in combination with one or more of the first through fourteenth aspects, the guard period associated with the switch from the first communication mode to the second communication mode is different from a guard period associated with a switch from the second communication mode to the first communication mode.

In a sixteenth aspect, alone or in combination with one or more of the first through fifteenth aspects, when the first communication mode is downlink reception and the second communication mode is uplink transmission, the guard period is shorter than a guard period associated with a switch from the second communication to the first communication mode.

In a seventeenth aspect, alone or in combination with one or more of the first through sixteenth aspects, when the first communication mode is uplink transmission and the second communication mode is downlink reception, the guard period is longer than a guard period associated with a switch from the second communication to the first communication mode.

In an eighteenth aspect, alone or in combination with one or more of the first through seventeenth aspects, process 800 includes providing guard period support information associated with the UE.

In a nineteenth aspect, alone or in combination with one or more of the first through eighteenth aspects, a resolution of the guard period support information is in terms of symbols, slots, or subframes.

In a twentieth aspect, alone or in combination with one or more of the first through nineteenth aspects, the guard period support information includes information that identifies a reference subcarrier spacing corresponding to the guard period support information.

In a twenty-first aspect, alone or in combination with one or more of the first through twentieth aspects, the guard period is a function of a numerology associated with the first communication mode or the second communication mode.

In a twenty-second aspect, alone or in combination with one or more of the first through twenty-first aspects, process 800 includes determining a collision rule associated with managing a potential collision involving an uplink communication or the guard period; and managing the potential collision based at least in part on the collision rule.

In a twenty-third aspect, alone or in combination with one or more of the first through twenty-second aspects, the potential collision is between a SSB or a CSI-RS and at least one of: the uplink communication or the guard period.

In a twenty-fourth aspect, alone or in combination with one or more of the first through twenty-third aspects, the collision rule indicates that the UE is to perform a RRM measurement and drop the uplink communication.

In a twenty-fifth aspect, alone or in combination with one or more of the first through twenty-fourth aspects, the collision rule indicates that the UE is to skip a radio RRM measurement and transmit the uplink communication.

In a twenty-sixth aspect, alone or in combination with one or more of the first through twenty-fifth aspects, the collision rule indicates that the UE is not to expect a collision involving an SSB or CSI-RS for mobility.

In a twenty-seventh aspect, alone or in combination with one or more of the first through twenty-sixth aspects, the collision rule indicates that the UE is to manage the potential collision based at least in part on a service type of the uplink communication.

In a twenty-eighth aspect, alone or in combination with one or more of the first through twenty-seventh aspects, the potential collision is between the guard period and a pre-scheduled or pre-configured resource associated with the uplink communication.

In a twenty-ninth aspect, alone or in combination with one or more of the first through twenty-eighth aspects, the collision rule indicates that the UE is to drop the uplink communication.

In a thirtieth aspect, alone or in combination with one or more of the first through twenty-ninth aspects, the collision rule indicates that the UE is to puncture a portion the uplink communication that collides with the guard period.

In a thirty-first aspect, alone or in combination with one or more of the first through thirtieth aspects, the pre-scheduled or pre-configure resource is associated with at least one of: a RACH occasion, a PUSCH occasion associated with a RACH procedure, or a grant-free uplink transmission.

In a thirty-second aspect, alone or in combination with one or more of the first through thirty-first aspects, the potential collision is between a downlink communication and at least one of the uplink communication or the guard period.

In a thirty-third aspect, alone or in combination with one or more of the first through thirty-second aspects, the collision rule indicates that the UE is to drop the uplink communication and receive the downlink communication.

In a thirty-fourth aspect, alone or in combination with one or more of the first through thirty-third aspects, the collision rule indicates that the UE is to drop the downlink communication and transmit the uplink communication.

In a thirty-fifth aspect, alone or in combination with one or more of the first through thirty-fourth aspects, the collision rule indicates that the UE is not to expect collisions between downlink communications and uplink communications.

In a thirty-sixth aspect, alone or in combination with one or more of the first through thirty-fifth aspects, the downlink communication is at least one of: a paging PDCCH, a paging PDSCH, a system information PDCCH, or a system information PDSCH.

In a thirty-seventh aspect, alone or in combination with one or more of the first through thirty-sixth aspects, the collision rule indicates that the UE is to manage the potential collision based at least in part on a configuration of the UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    determining a guard period associated with switching from a first communication mode to a second communication mode,
        wherein the UE is operating in a half-duplex frequency division duplexing (FDD) mode of operation,
        wherein the guard period associated with switching from the first communication mode to the second communication mode is different than a guard period associated with switching from the second communication mode to the first communication mode, and
        wherein the guard period is determined based at least in part on at least one of:
            a determination of whether a number of phase locked loops (PLLs) associated with the UE to be used for the first communication mode is less than a number of PLLs associated with the UE to be used for the second communication mode, or
            a determination of whether a particular subcarrier spacing corresponds to a first particular subcarrier spacing associated with the UE or a second particular subcarrier spacing associated with the UE, wherein the first particular subcarrier spacing is associated with the first communication mode and operates at a different kilohertz (kHz) subcarrier spacing relative to the second particular subcarrier spacing associated with the second communication mode;
    providing an indication of the guard period; and
    switching from the first communication mode to the second communication mode based at least in part on the guard period.

2. The method of claim 1, wherein the UE is to use a single PLL for both the first communication mode and the second communication mode.

3. The method of claim 1, wherein the UE is to use a first PLL for the first communication mode and a second PLL for the second communication mode.

4. The method of claim 1, further comprising:
    providing an indication of whether the UE supports a first guard period type or supports a second guard period type.

5. The method of claim 1, further comprising: providing an indication that the UE supports operation in the half-duplex FDD mode of operation.

6. The method of claim 1, wherein the guard period is a function of the particular subcarrier spacing over a fixed time duration.

7. The method of claim 1, wherein the particular subcarrier spacing is a subcarrier spacing associated with receiving a downlink communication or is a subcarrier spacing associated with transmitting an uplink communication.

8. The method of claim 1, wherein the particular subcarrier spacing is a fixed reference subcarrier spacing.

9. The method of claim 1, wherein the particular subcarrier spacing is based at least in part on the first communication mode being downlink reception and the second communication mode being uplink transmission.

10. The method of claim 1, wherein the particular subcarrier spacing is based at least in part on the first communication mode being uplink transmission and the second communication mode being downlink reception.

11. The method of claim 1, wherein, when the first communication mode is downlink reception and the second communication mode is uplink transmission, the guard period is shorter than a guard period associated with a switch from the second communication mode to the first communication mode.

12. The method of claim 1, wherein, when the first communication mode is uplink transmission and the second communication mode is downlink reception, the guard period is longer than a guard period associated with a switch from the second communication mode to the first communication mode.

13. The method of claim 1, further comprising:
providing guard period support information associated with the UE, the guard period support information including information that identifies a reference subcarrier spacing corresponding to the guard period support information,
wherein a resolution of the guard period support information is in terms of symbols, slots, or subframes.

14. The method of claim 1, wherein the guard period is a function of a numerology associated with the first communication mode or the second communication mode.

15. The method of claim 1, further comprising:
determining a collision rule associated with managing a potential collision involving an uplink communication or the guard period; and
managing the potential collision based at least in part on the collision rule.

16. The method of claim 15, wherein the potential collision is between a synchronization signal block (SSB) or a channel state information reference signal (CSI-RS) and at least one of:
the uplink communication, or
the guard period.

17. The method of claim 16, wherein the collision rule indicates one of:
that the UE is to perform a radio resource management (RRM) measurement and drop the uplink communication,
that the UE is to skip the RRM measurement and transmit the uplink communication,
that the UE is not to expect a collision involving an SSB or CSI-RS for mobility, or
that the UE is to manage the potential collision based at least in part on a service type of the uplink communication.

18. The method of claim 15, wherein the potential collision is between the guard period and a pre-scheduled or pre-configured resource associated with the uplink communication.

19. The method of claim 18, wherein the collision rule indicates one of:
that the UE is to drop the uplink communication, or
that the UE is to puncture a portion of the uplink communication that collides with the guard period.

20. The method of claim 18, wherein the pre-scheduled or pre-configure resource is associated with at least one of:
a random access channel (RACH) occasion,
a physical uplink shared channel (PUSCH) occasion associated with a RACH procedure, or
a grant-free uplink transmission.

21. The method of claim 15, wherein the potential collision is between a downlink communication and at least one of the uplink communication or the guard period.

22. The method of claim 21, wherein the collision rule indicates one of:
that the UE is to drop the uplink communication and receive the downlink communication,
that the UE is to drop the downlink communication and transmit the uplink communication, or
that the UE is not to expect collisions between downlink communications and uplink communications.

23. The method of claim 21, wherein the downlink communication is at least one of:
a paging physical downlink control channel (PDCCH),
a paging physical downlink shared channel (PDSCH),
a system information PDCCH, or
a system information PDSCH.

24. The method of claim 15, wherein the collision rule indicates that the UE is to manage the potential collision based at least in part on a configuration of the UE.

25. A user equipment (UE) for wireless communication, comprising:
a memory; and
one or more processors coupled to the memory, the one or more processors configured to:
determine a guard period associated with switching from a first communication mode to a second communication mode,
wherein the UE is operating in a half-duplex frequency division duplexing (FDD) mode of operation,
wherein the guard period associated with switching from the first communication mode to the second communication mode is different than a guard period associated with switching from the second communication mode to the first communication mode, and
wherein the guard period is determined based at least in part on at least one of:
a determination of whether a number of phase locked loops (PLLs) associated with the UE to be used for the first communication mode is less than a number of PLLs associated with the UE to be used for the second communication mode, or
a determination of whether a particular subcarrier spacing corresponds to a first particular subcarrier spacing associated with the UE or a second particular subcarrier spacing associated with the UE, wherein the first particular subcarrier spacing is associated with the first communication mode and operates at a different kilohertz (kHz)

subcarrier spacing relative to the second particular subcarrier spacing associated with the second communication mode;
provide an indication of the guard period; and
switch from the first communication mode to the second communication mode based at least in part on the guard period.

26. A non-transitory computer-readable medium storing one or more instructions for wireless communication, the one or more instructions comprising:
one or more instructions that, when executed by one or more processors of a user equipment (UE), cause the one or more processors to:
determine a guard period associated with switching from a first communication mode to a second communication mode,
wherein the UE is operating in a half-duplex frequency division duplexing (FDD) mode of operation,
wherein the guard period associated with switching from the first communication mode to the second communication mode is different than a guard period associated with switching from the second communication mode to the first communication mode, and
wherein the guard period is determined based at least in part on at least one of:
a determination of whether a number of phase locked loops (PLLs) associated with the UE to be used for the first communication mode is less than a number of PLLs associated with the UE to be used for the second communication mode, or
a determination of whether a particular subcarrier spacing corresponds to a first particular subcarrier spacing associated with the UE or a second particular subcarrier spacing associated with the UE, wherein the first particular subcarrier spacing is associated with the first communication mode and operates at a different kilohertz (kHz) subcarrier spacing relative to the second particular subcarrier spacing associated with the second communication mode; and
switch from the first communication mode to the second communication mode based at least in part on the guard period.

27. An apparatus for wireless communication, comprising:
means for determining a guard period associated with switching from a first communication mode to a second communication mode,
wherein the apparatus is operating in a half-duplex frequency division duplexing (FDD) mode of operation,
wherein the guard period associated with switching from the first communication mode to the second communication mode is different than a guard period associated with switching from the second communication mode to the first communication mode, and
wherein the guard period is determined based at least in part on at least one of:
a determination of whether a number of phase locked loops (PLLs) associated with the apparatus to be used for the first communication mode is less than a number of PLLs associated with the apparatus to be used for the second communication mode, or a determination of whether a particular subcarrier spacing corresponds to a first particular subcarrier spacing associated with the apparatus or a second particular subcarrier spacing associated with the apparatus, wherein the first particular subcarrier spacing is associated with the first communication mode and operates at a different kilohertz (kHz) subcarrier spacing relative to the second particular subcarrier spacing associated with the second communication mode;
means for providing an indication of the guard period; and
means for switching from the first communication mode to the second communication mode based at least in part on the guard period.

28. The method of claim 1, further comprising:
providing the indication of the guard period in a capability report.

29. The UE of claim 25, wherein the one or more processors, to provide the indication of the guard period, are further configured to:
provide the indication of the guard period in a capability report.

30. A method of wireless communication performed by a network entity, comprising:
receiving an indication of a guard period associated with a user equipment (UE) for switching from a first communication mode to a second communication mode,
wherein the guard period associated with switching from the first communication mode to the second communication mode is different than a guard period associated with switching from the second communication mode to the first communication mode;
determining, based on the indication that the UE is operating in a half-duplex frequency division duplexing (FDD) mode of operation,
wherein the guard period corresponds to at least one of:
a determination of whether a number of phase locked loops (PLLs) associated with the UE to be used for the first communication mode is less than a number of PLLs associated with the UE to be used for the second communication mode, or
a determination of whether a particular subcarrier spacing corresponds to a first particular subcarrier spacing associated with the UE or a second particular subcarrier spacing associated with the UE, wherein the first particular subcarrier spacing is associated with the first communication mode and operates at a different kilohertz (kHz) subcarrier spacing relative to the second particular subcarrier spacing associated with the second communication mode; and
communicating with the UE based at least in part on the guard period.

31. A base station for wireless communication, comprising:
a memory; and
one or more processors coupled to the memory, the one or more processors configured to:
receive an indication of a guard period associated with a user equipment (UE) for switching from a first communication mode to a second communication mode,
wherein the guard period associated with switching from the first communication mode to the second communication mode is different than a guard period associated with switching from the second communication mode to the first communication mode;

determine, based on the indication, that the UE is operating in a half-duplex frequency division duplexing (FDD) mode of operation, wherein the guard period corresponds to at least one of:
  a determination of whether a number of phase locked loops (PLLs) associated with the UE to be used for the first communication mode is less than a number of PLLs associated with the UE to be used for the second communication mode, or
  a determination of whether a particular subcarrier spacing corresponds to a first particular subcarrier spacing associated with the UE or a second particular subcarrier spacing associated with the UE, wherein the first particular subcarrier spacing is associated with the first communication mode and operates at a different kilohertz (kHz) subcarrier spacing relative to the second particular subcarrier spacing associated with the second communication mode; and communicate with the UE based at least in part on the guard period.

32. The base station of claim 31, wherein the one or more processors are further configured to:
  receive an indication of whether the UE supports a first guard period type or supports a second guard period type.

33. The base station of claim 31, wherein the guard period is a function of the particular subcarrier spacing over a fixed time duration.

34. The base station of claim 31, wherein the particular subcarrier spacing is a fixed reference subcarrier spacing.

* * * * *